US011286021B2

(12) United States Patent
Ryden et al.

(10) Patent No.: US 11,286,021 B2
(45) Date of Patent: Mar. 29, 2022

(54) SENSOR FASTENER ARRANGEMENT

(71) Applicant: SAAB AB, Linkoeping (SE)

(72) Inventors: Jan Ryden, Moelnlycke (SE); Johan Oestberg, Goeteborg (SE)

(73) Assignee: SAAB AB, Linkoeping (SE)

(*) Notice: Subject to any disclaimer, the term of this patent is extended or adjusted under 35 U.S.C. 154(b) by 0 days.

(21) Appl. No.: 17/250,736

(22) PCT Filed: Sep. 3, 2019

(86) PCT No.: PCT/SE2019/050821
§ 371 (c)(1),
(2) Date: Feb. 26, 2021

(87) PCT Pub. No.: WO2020/050766
PCT Pub. Date: Mar. 12, 2020

(65) Prior Publication Data
US 2021/0245840 A1    Aug. 12, 2021

(30) Foreign Application Priority Data
Sep. 4, 2018  (SE) .................................... 1851042-0

(51) Int. Cl.
*B63B 17/00* (2006.01)
*B63B 3/09* (2006.01)
(Continued)

(52) U.S. Cl.
CPC ............ *B63B 17/0081* (2013.01); *B63B 3/09* (2013.01); *B63B 3/10* (2013.01); *B63B 3/14* (2013.01);
(Continued)

(58) Field of Classification Search
CPC ............ B63B 2241/00; B63B 2241/20; B63B 2221/00; B63B 2221/20; B63B 2213/00;
(Continued)

(56) References Cited

U.S. PATENT DOCUMENTS

| 4,892,051 A | 1/1990 | Taylor et al. |
| 8,992,129 B2 | 3/2015 | Yasui |

(Continued)

FOREIGN PATENT DOCUMENTS

| CN | 107975556 A | 5/2018 |
| EP | 0015118 A1 | 9/1980 |

(Continued)

OTHER PUBLICATIONS

International Searching Authority, International Search Report and Written Opinion received for International Application No. PCT/SE2019/050821, dated Oct. 14, 2019, 10 pages, Swedish Patent and Registration Office, Sweden.

(Continued)

*Primary Examiner* — Daniel V Venne
(74) *Attorney, Agent, or Firm* — Alston & Bird LLP

(57) ABSTRACT

The invention relates to a sensor fastener arrangement (10*a-f*) for holding a sensor device (3). The sensor fastener arrangement (10*a-f*) comprises a plurality of fastener elements (20*a*, 20*b*). The fastener elements (20*a*, 20*b*) are configured to arrange the sensor device (3) to a platform (1). Respective fastener element (20*a*, 20*b*) is rigid in a first state and reversibly deformable in a second state. When the platform (1) of the sensor device (10*a-f*), and/or the sensor device (3), is exposed to an impact force, in turn exposing a fastener element (20*a*, 20*b*) to a compressive force exceeding a critical load of that fastener element (20*a*, 20*b*), the fastener element (20*a*, 20*b*) goes from being in the first state to temporarily being in the second state. Thereby the fastener element (20*a*, 20*b*) goes from having a first rigid shape to temporarily being reversibly deformed, after which, when the impact force is terminated, the fastener element (20*a*, 20*b*) goes from temporarily being in the second state back to being in the first state. Thereby the fastener element (20*a*, (Continued)

20*b*) goes from temporarily being reversibly deformed to having the first rigid shape.

17 Claims, 5 Drawing Sheets

(51) Int. Cl.
| | |
|---|---|
| *B63B 3/10* | (2006.01) |
| *B63B 3/14* | (2006.01) |
| *F16F 15/02* | (2006.01) |
| *H01Q 1/00* | (2006.01) |
| *H01Q 1/20* | (2006.01) |
| *H01Q 1/34* | (2006.01) |

(52) U.S. Cl.
CPC ............ *F16F 15/02* (2013.01); *H01Q 1/002* (2013.01); *H01Q 1/005* (2013.01); *H01Q 1/20* (2013.01); *H01Q 1/34* (2013.01); *B63B 2017/0054* (2013.01)

(58) Field of Classification Search
CPC . B63B 2201/20; B63B 17/00; B63B 17/0081; B63B 2017/0054; H01Q 1/00; H01Q 1/002; H01Q 1/005; H01Q 1/20; H01Q 1/34; F16F 15/02
USPC ............. 248/511; 114/89, 90, 343, 354, 382
See application file for complete search history.

(56) References Cited

U.S. PATENT DOCUMENTS

| | | |
|---|---|---|
| 2007/0151493 A1 | 7/2007 | Graf et al. |
| 2012/0194395 A1 | 8/2012 | Williams |
| 2015/0069204 A1* | 3/2015 | Daniels .................... H01Q 1/34 248/516 |

FOREIGN PATENT DOCUMENTS

| | | |
|---|---|---|
| EP | 3121894 A1 | 1/2017 |
| WO | WO 2017/105303 A1 | 6/2017 |

OTHER PUBLICATIONS

Swedish Patent and Registration Office, Office Action, including Search Report, received for Application No. 1851042-0, dated Apr. 2, 2019, 9 pages, Sweden.

* cited by examiner

SENSOR FASTENER ARRANGEMENT

CROSS REFERENCE TO RELATED APPLICATIONS

This application is a National Stage Application, filed under 35 U.S.C. § 371, of International Application No. PCT/SE2019/050821, filed Sep. 3, 2019, which claims priority to Swedish Application No. 1851042-0, filed Sep. 4, 2018; the contents of both of which are hereby incorporated by reference in their entireties.

BACKGROUND

Related Field

The invention relates to a sensor fastener arrangement for holding and protecting a sensor device such as an antenna, an aiming device or any other sensor device that requires high pointing accuracy. The invention may be applicable for ships and other naval applications. Although the invention primarily is described with respect to an antenna installation on a ship, the invention is not restricted to this particular use, but may also be used for example for sights or rangefinders, at other naval applications or land vehicles.

Description of Related Art

Reliable and accurate functionality of sensors such as radar devices, various forms of antennas, aiming devices such as sights and rangefinders, hereinafter generally referred to as sensor devices, is essential for the operability of for example naval applications such as ships, as well as for many other military and civilian applications. In order for a sensor device such as an antenna or a sight to consider and/or compensate for the movements of the platform on which the sensor device is arranged, the fixed position of the sensor device together with input from for example a gyro may be used. It is important that the exact position and direction of the sensor device is known and even the smallest dislocation from a presumed fixed position and direction may cause significant deviation over distance, thus impair accuracy and functionality of the sensor device significantly. In worst case making the sensor device inoperable. Failure of for example radar functionality or functionality of sights might have disastrous consequences.

Sensor devices such as radar devices, laser sights, rangefinders and antennas are generally complex devices constructed by various highly sensitive electronic components connected to each other in complex networks. For example deliberate or unintentional underwater shocks, such as for example due to mine detonation, and even extremely rough sea, may expose such complex electronics and sensitive equipment for significant acceleration forces. Such forces are also referred to as impact shock or shock load. Herein such forces are generally referred to as impact force. Thus, impact force may damage such complex electronics and such sensitive equipment.

Thus, for sensor devices, and other highly sensitive equipment where high pointing accuracy is important, even the smallest dislocation may be problematic and should be avoided by all possible means. Impact force and accelerating forces may affect or damage such sensor devices and/or may impair their usability.

Current impact force absorbing solutions often use complex systems relying on for example delicate hydraulic or pneumatic solutions, complex control algorithms or feedback control systems. Such solutions are often slow, costly, add significant weight and/or are bulky, and they are also often not sufficiently robust for the rough conditions such installations may be exposed to.

Thus, there is a need of further improvements.

BRIEF SUMMARY

An object of the invention is to provide a sensor fastener arrangement, which ensures rigid positioning of a sensor device that requires high pointing accuracy. Another object of the invention is to protect such sensor devices from impact force. Objects of the invention are achieved by a sensor fastener arrangement according to claim 1. Yet an object of the invention is to provide an antenna installation comprising a sensor device in form of an antenna and a sensor fastener arrangement according to the invention.

Sensor devices such as for example antennas, radars, rangefinders and aiming devices such as sights generally comprise sensitive electronics connected in complex networks. At the same time, in order for such sensor devices to operate properly and provide useful sensor data it is generally important that the sensor device is tightly secured at a known location and that the positioning of the sensor device is fixed. Even the smallest spatial dislocation or displacement of the sensor device may deteriorate the measurement data provided by the sensor device and may even make measurement data provided useless. A small displacement of an aiming device such as a sight may for example give a significant error over distance and a small spatial dislocation of an antenna such as a phased array antenna may provide less useful information, if not compensated for. Thus, sensor devices, and their installations, are very sensitive to impact force. Impact force is herein defined as a significant and temporary force, i.e. impact force is a force that delivers a shock or high impact in a relatively short period of time. Impact force is for example what a ship is exposed to if an underwater mine detonates in the vicinity of the ship at sea.

The invention refers to a sensor fastener arrangement for holding a sensor device which requires high pointing accuracy, i.e. it is important that the direction in which the sensor device is directed is fixed. The sensor fastener arrangement comprises a plurality of fastener elements, wherein the fastener elements are configured to arrange the sensor device to a platform. The fastener elements may e.g. either be arranged directly to the sensor device, for example by being directly arranged to an antenna, or may be indirectly arranged to the sensor device, for example by being arranged to a frame structure to which the sensor device is attached. The fastener elements are capable of adopting two different states, wherein respective fastener element is rigid in a first state and reversibly deformable in a second state. When the platform of the sensor device and/or the sensor device is exposed to an impact force in turn exposing a fastener element to a compressive force exceeding a critical load of that fastener element the fastener element goes from being in the first state to temporarily being in the second state. Thereby the fastener element goes from having a first rigid shape to temporarily being reversibly deformed. When the impact force is terminated the fastener element goes from temporarily being in the second state back to being in the first state, whereby the fastener element goes from temporarily being reversibly deformed back to having the first rigid shape.

When herein referring to platform what is considered is preferably a vehicle provided with a sensor device, wherein the sensor device is arranged to the vehicle by means of a sensor fastener arrangement according to the invention. The vehicle may for example be a type of naval vehicle such as a ship or a destroyer.

All potential materials, which a fastener element according to the present invention may be made of, exhibits some degree of elasticity. However, for contemplated materials such as materials with high Young modulus, for example spring steel or carbon fiber composite, this elasticity is negligible. According to the invention, the fastener elements are designed such that the physical spring properties are sufficiently high so that the pointing accuracy of the sensor device is not affected by inherent elasticity and that the critical load is exceeded before the sensor device is exposed to a damaging force. Thereby, even if fixed positioning of sensor devices is very important, and even if every fastener element has an inherent elasticity, the fastener elements can be considered to be rigid and thereby to be able to rigidly secure and hold a sensor device to a platform. Thus, when herein referring to that a fastener element is rigid when in a first state what is considered is that the fastener element does not bend or spring at all when being in the first state and being exposed to a force, but that the fastener element maintains the same shape. Thereby the sensor device held by the fastener element, preferably together with more fastener elements, is held at a fixed position. Hence, when the fastener elements of a sensor device all are in the first state rigid positioning of a sensor device is ensured, whereby high pointing accuracy is ensured.

According to the invention, respective fastener element is deformed when the platform, to which the sensor device is arranged, and/or the sensor device itself is exposed to an impact force, in turn resulting in that the fastener element is exposed to a compressive force, exceeding a critical load. All fastener elements of a sensor fastener arrangement may either deform, i.e. go to the second state, at the same critical load or may deform at different critical loads. This is a design parameter dependent on the individual realization of the sensor fastener arrangement and will be discussed more in the detailed description of exemplary embodiments of the invention. The deformation of the fastener element at least partially absorbs the shock effect of the impact force whereby the actual force the sensor device is exposed to is limited. Thus, the invention has the exemplary advantage that a sensitive sensor device can be protected from impact force which possibly otherwise would be damaging for the sensor device.

A compressive force is herein defined as the force provided by a compressive load. When the compressive force due to the compressive load exceeds what herein is referred to as the critical load a long column, like the fastener elements herein discussed, will undergo lateral deflection or bending. This behaviour is called buckling and may for example occur even though the maximum stress in the column is less than the yield stress of the material. As will be discussed more in detail later on, the load at which a column will buckle is for example affected by material properties, column length, cross section, and end conditions.

Thus, the behaviour of the fastener elements differs significantly from the behaviour of springs. When a spring, such as for example a spiral spring, is exposed to a force acting in the longitudinal direction of the spring the spring starts to be compressed. For an ideal spring, the compression is linear. When the spring compression has been initiated, the compression of an ideal spring continues to be relatively linear. In contrast to such behaviour fastener elements of a sensor fastener arrangement according to the invention are rigid, i.e. is completely stiff, until the compressive force exceeds the critical load of the fastener element. The inherent elasticity of the fastener element can here be neglected. Once the compressive force is exceeded and the fastener element reversely deforms. Once the reversible deformation is initiated, the additional force required for further bending or buckling the deformed fastener element may be relatively modest. Additionally, a spiral spring, at least if not being complemented by additional arrangements configured to add transverse stability to the spiral spring, provides no or at least very little support in its transverse direction.

According to a development of the invention, the sensor device has a maximum acceleration limit defining the maximum acceleration the sensor may be exposed to without being damaged. According to the invention, the critical load of the fastener elements is selected such that respective fastener elements reversibly deform before the sensor device is exposed to the maximum acceleration limit.

This can also be referred to as that critical load of respective fastener element is selected such that by being reversibly deformed the force the sensor device is expose to is held below a predetermined critical sensor impact acceleration.

Every sensor device, such as for example a sight or a specific antenna, is designed to withstand a defined impact force. This can be referred to as the maximum acceleration limit of the sensor device, or to as the the critical sensor device impact acceleration. High resistance to impact shock may for example be obtained by using components of thicker or more durable goods, making soldering thicker and by adding additional components with the single purpose of increasing durability or strength. This generally adds cost, weight and also makes the components, and thereby installations of components, more bulky. Thereby, generally, the higher impact shock a sensor device is configured to withstand the heavier and more costly it is. Thus, an exemplary advantage with the development of the invention is that by selecting the critical load of the fastener elements such that the fastener elements with certainty deform before the sensor device is exposed to the maximum acceleration limit, the sensor device is protected. Further exemplary advantages are that for a certain implementation a sensor device designed to withstand lower impact shock, possibly being less costly, have lower weight and be less bulky, may be selected if a sensor fastener arrangement according to the invention is used.

According to yet a development of the invention, the fastener elements are rigid in an essentially straight configuration when being in the first state and temporarily reversibly deform by lateral deflection when being in the second state. This will be explained more in detail in the detailed description of exemplary embodiments of the invention.

According to another development of the invention, respective fastener element has an extension along a first axis, along a second axis and along a third axis. The extension along one of the first, second or third axes is larger than the extension along the two remaining axes. The extension along one of the two remaining axes is larger than the extension along of the finally remaining axis. Thus, according to this development of the invention the fastener elements can be said to have the form of essentially flat bars with essentially quadratically shaped cross section. This is further explained in the detailed description of exemplary embodiments of the invention.

The dimensions of respective fastener element, i.e. the extension along the first, second and third axis, are configured such that desired properties are obtained in regards to stiffness, physical spring properties and critical load in respective direction. The desired properties of the fastener elements used are dependent on the implementation of the sensor fastener arrangement.

According to another development of the invention, the fastener elements may be provided in the form of rods with essentially circular cross section.

Each fastener element has a first and a second end positioned in opposite ends of the fastener element. A first direction of the fastener element is defined as being directed in the direction pointing from the end of the fastener element arranged to a platform and in the direction of the end of the fastener element directly or indirectly arranged to a sensor device. A second direction of the fastener element is defined as being directed opposite the first direction, i.e. in the direction pointing from the end of the fastener element arranged directly or indirectly to a sensor device and in the direction of the end of the fastener element arranged to a platform device.

According to yet a development of the invention, when the sensor device is exposed to a force in turn exposing respective fastener element to a compressive force, the compressive force acts on the fastener element along an axis of deformation, and wherein respective fastener element is reversibly deformable by a compressive movement along the axis of deformation. Thus, when being deformed the fastener elements are buckled such that the longitudinal extension of the fastener element is temporarily decreased. This is what is referred to as compressive movement, i.e. deformation decreasing the longitudinal extension. This temporary decrease in extension, due to buckling of the fastener element, is herein generally referred to as compression. The temporary decrease in longitudinal extension of the fastener element due to compression occurs along an axis which herein is referred to as the axis of deformation. This is further explained in the detailed description of exemplary embodiments of the invention.

According to developments of the invention, in addition to fastener elements the sensor fastener arrangement may comprise at least one damper. According to one development the at least one damper is arranged to dampen a compressive movement at least along the axis of deformation. According to another development the at least one damper is arranged to dampen extending movements at least along the axis of deformation.

As previously stated, compressive movement may be defined as deformation decreasing the longitudinal extension. Extending movement is the opposite movement to compressive movement, i.e. the increase or extension in longitudinal direction.

Once the critical load of a fastener element is exceeded, and the fastener element has started to deform, the load required for further deformation is lower. Thus, dampers configured for dampen compressive movement provide the exemplary advantage that, once the fastener elements of the sensor fastener arrangement starts to deform the reversible deformation by the compressive movement is dampened. Thereby the acceleration the sensor device is exposed to when the fastener elements reversibly deform is decreased.

Dampers configured for dampening extending movement provide the exemplary advantage that once the fastener elements has been reversibly deformed use of a damper prevents that the deformed fastener element forcefully springs back whereby a whiplash effect can be avoided. Thereby, it may for example be avoided that the fastener element deforms when springing back, or that the sensor device may be damaged due to a whiplash.

The invention is not limited to having one damper or to have a plurality of dampers all configured to dampen either compressive or extending movements. As will be discussed more in the detail description of exemplary embodiments of the invention, the number of, and positioning of, dampers may differ and it is possible to have both dampers configured to dampen compressive movement and to have dampers configured to dampen extending movement.

According to developments of the invention the at least one damper is a damper from a group of possible damper arrangements comprising; hydraulic dampers, viscous dampers and/or spring dampers.

Depending on for example the specific implementation, the type of sensor device and the properties of the sensor device various types of dampers may be preferred. It is also possible to combine different types of dampers.

According to a development of the present invention, respective fastener element is attachable to a sensor device in a first end and to a platform in a second end, wherein the first end and the second end are opposite ends of the fastener element along the axis of deformation. The fastener elements may be either directly or indirectly arranged, for example by being arranged to a frame, which in turn is configured for holding the sensor device, to the sensor device. The platform may for example be a vehicle such as a type of naval vehicle such as a frigate, corvette, aircraft carrier or a destroyer. According to one development of the invention, at least one of Euler's laws of critical load applies for the fastener elements, whereby the fastener elements are selected based on their critical load. Which of Euler's laws of critical load a fastener element of a sensor fastener arrangement complies with is for example dependent on how respective fastener element is, directly or indirectly, arranged to the sensor device and to the platform. This is referred to as the end conditions of the fastener element. The fastener elements may be fixedly arranged or hingedly arranged to the sensor device, or a frame thereof, and to the platform. This is herein also referred to as end conditions. Thus, controlling how the fastener elements are arranged to the sensor device and the platform respectively is one of the parameters that are controllable in order to obtain desired properties of the sensor fastener arrangement.

Other controllable parameters that affects the properties of a fastener element are the dimensions of the fastener element, i.e. the length, width and thickness, and if a fastener element has an essentially quadratically shaped cross section or an essentially circular cross section. Another controllable parameter is selected material of the fastener elements and material properties thereof.

According to one development of the invention, the first and second ends of a fastener element are configured to be fixedly attachable to the sensor device and to the platform, whereby the critical load of the fastener element is determined by applying Euler's fourth law of critical load. According to another development of the invention, the first and second ends of a fastener element are configured to be hingedly attachable to the sensor device and to the platform, whereby the critical load of the fastener element is determined by applying Euler's second law of critical load. Fastener elements governed by Euler's second law of critical load give the highest stiffness of the fastener element before buckling occurs, and once buckling has occurred, gives the lowest buckling load. Buckling load, also referred to bending load, is defined as the threshold load required for bending or buckling of the fastener element. According to yet another development of the invention, one of the first and second ends of a fastener element is configured to be attachable to the sensor device and the other end is configured to be attachable to the platform. One of the first and second ends of the fastener element is fixedly attachable and the other end is hingedly attachable. Thereby the critical load of the fastener element is determined by applying Euler's third law of critical load.

According to a development of the invention, the sensor device is an antenna, a rangefinder or an aiming device. Antennas, such as for example phased array antennas, or aiming devices, such as for example various types of sights, are exemplary sensor devices for which high pointing accuracy is desirable, thus for which the invention advantageously can be implemented.

The invention also relates to an antenna installation comprising a sensor fastener arrangement according to any one of, or a combination of, developments of the invention and a sensor device in form of an antenna. According to one developments of the invention, the antenna may be a panel antenna. According to another development of the invention, the antenna may be a phased array antenna. The invention also relates to a ship comprising an antenna installation according.

Further advantages and advantageous features of the invention are disclosed in the following description and in the dependent claims.

BRIEF DESCRIPTION OF THE FIGURES

With reference to the appended drawings, below follows a more detailed description of embodiments of the invention cited as examples.

In the drawings.

DETAILED DESCRIPTION OF VARIOUS EMBODIMENTS

The following description of exemplary embodiments of the invention is presented only for purposes of illustration and should not be seen as limiting. The description is not intended to be exhaustive and modifications and variations are possible in the light of the teachings herein, or may be acquired from practice of various alternative embodiments of the invention. The exemplary embodiments discussed herein were chosen and described in order to explain the principles and the nature of various embodiments and its practical application to enable one skilled in the art to utilize the exemplary embodiments in various manners, and with various modifications, as are suited to the particular use contemplated. It should be appreciated that the aspects presented herein separately may be practiced in any combination with each other unless otherwise explicitly is stated.

Figure 1:
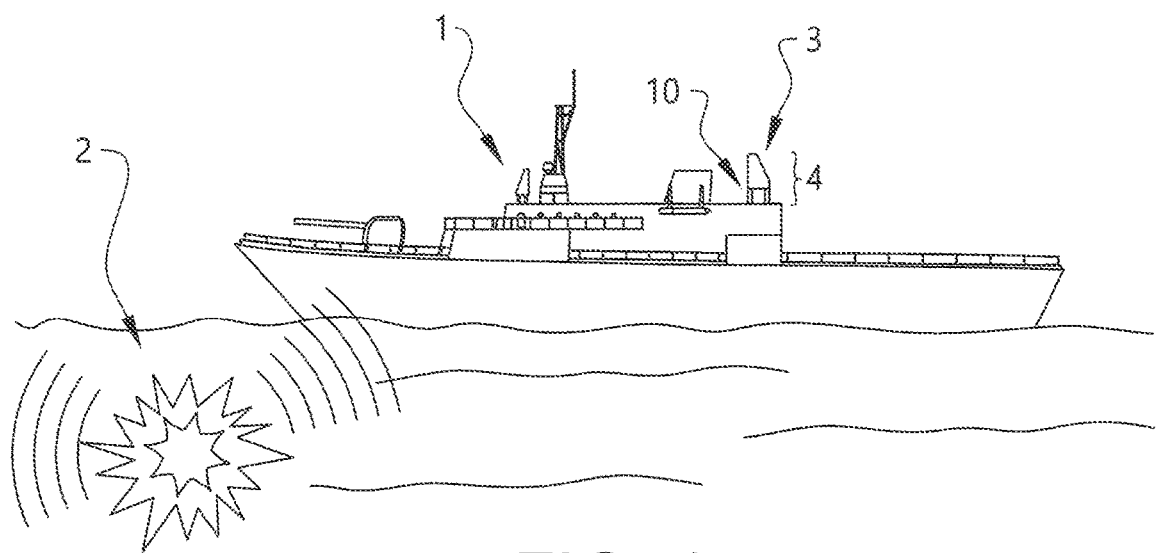
FIG. 1 discloses an exemplary platform provided with an antenna fastener arrangement according to the invention, and FIG. 2 schematically discloses Euler's second, third and fourth laws of critical load, FIG. 3a and FIG. 3b schematically disclose an exemplary embodiments of antenna fastener arrangements in a first and a second state, and FIG. 4a to FIG. 4e schematically discloses exemplary embodiments of antenna fastener arrangements holding sensor devices according to the invention.

FIG. 1 discloses a platform 1, in form of a ship, provided with a sensor device 3, in form of an antenna, arranged to the platform 1 by means of a sensor fastener arrangement 10.

The sensor fastener arrangement 10 is configured to protect the sensor device 3 from impact force due to for example mine detonation 2.

In the embodiment shown in FIG. 1 the antenna and the sensor fastener arrangement 10 forms an antenna installation 4. The antenna may for example be a phased array antenna, for example in the form of a panel antenna.

Figure 2:
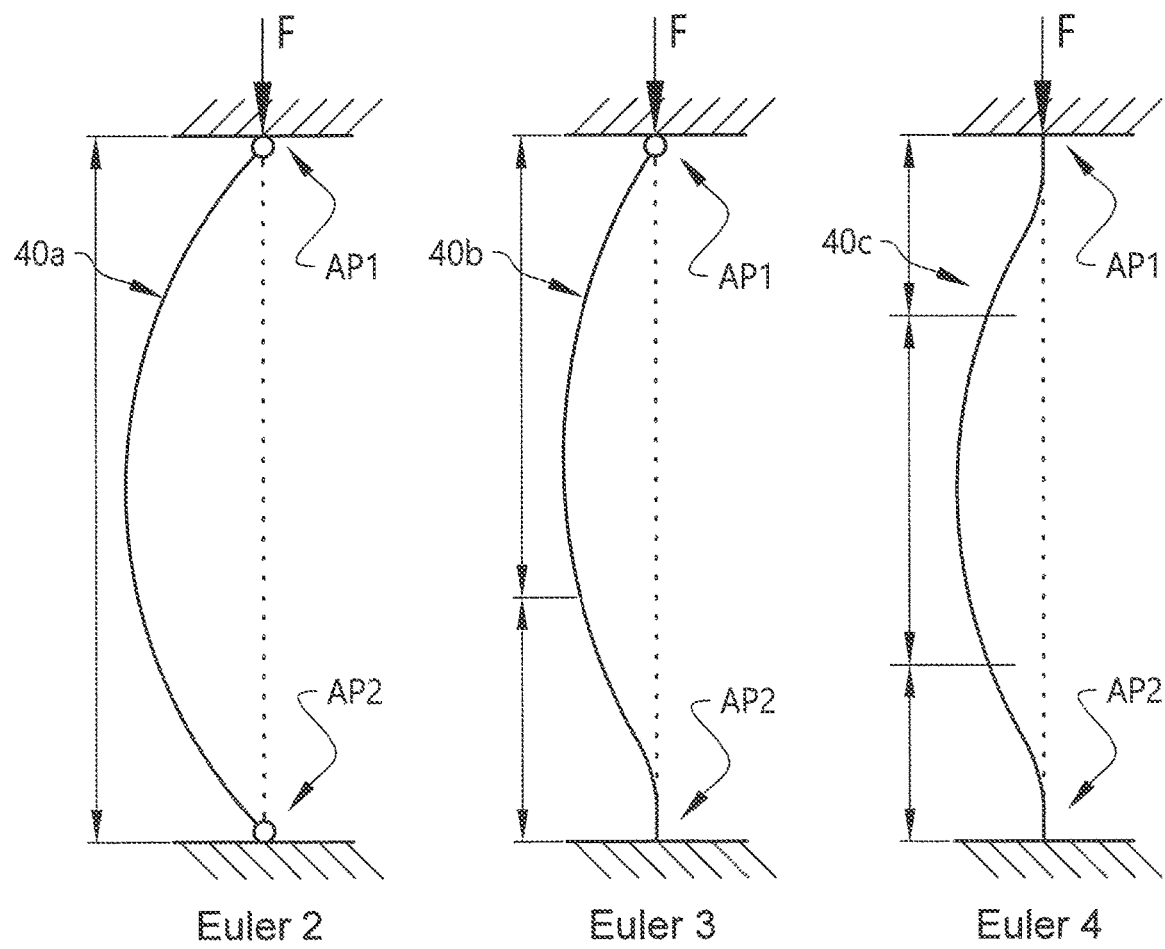

FIG. 2 schematically discloses three exemplary setups Euler 2, Euler 3, Euler 4 showing Euler's second, Euler's third and Euler's fourth laws of critical load. The laws of critical load are shown by having a column 40a, 40b, 40c attached at a first and a second attachment point AP1, AP2. What determines which of Euler's laws of critical load that apply is primarily controlled by the end conditions at respective first and second attachment point AP1, AP2. In FIG. 2 the first and second attachment points AP1, AP2 are referred to as upper attachment point AP1 and lower attachment point AP2.

The critical load is the maximum load that will not cause lateral deflection of the column 40a, 40b, 40c. Lateral deflection is herein also referred to as being bent or being buckled. Applying a force meeting the critical load puts the column 40a, 40b, 40c is in a state of unstable equilibrium. Applying additional force causes lateral deflection. The lateral deflection increases with additional load. The column 40a, 40b, 40c will remain straight for loads less than the critical load.

Thus, when a compressive force F is applied, as is indicated in FIG. 2, exceeding the critical load of respective exemplary setup Euler 2, Euler 3, Euler 4 the column 40a, 40b, 40c will bend.

In the first exemplary setup Euler 2 the column 40a is hingedly attached at both the upper and the lower attachment points AP1, AP2, whereby Euler's second low of critical load applies.

In the second exemplary setup Euler 3 the column 40b is hingedly attached at the upper attachment point AP1 and fixedly attached at the lower attachment point AP2, whereby Euler's third low of critical load applies. If the upper attachment point AP1 would be fixedly attached and the lower attachment point AP2 hingedly attached Euler's third low of critical load would also apply.

In the third exemplary setup Euler 4 the column 40c is fixedly attached at both the upper and the lower attachment points AP1, AP2, whereby Euler's fourth low of critical load applies.

Which of Euler's laws that applies for a specific setup determines the properties of an attached column in terms of for example stiffness, physical spring properties and resilience to additional load once lateral deflection of the column has been initiated.

FIGS. 3a, 3b and 4a to 4e disclose various sensor fastener arrangements 10, i.e. 10a-10f, comprising fastener elements 20, i.e. 20a and 20b. The invention is not to be seen as limited to these particular realizations, but these realizations of antenna fastener arrangements 10a-10f according to the invention are intended to show that the invention may be realized in various ways.

Figure 3A:
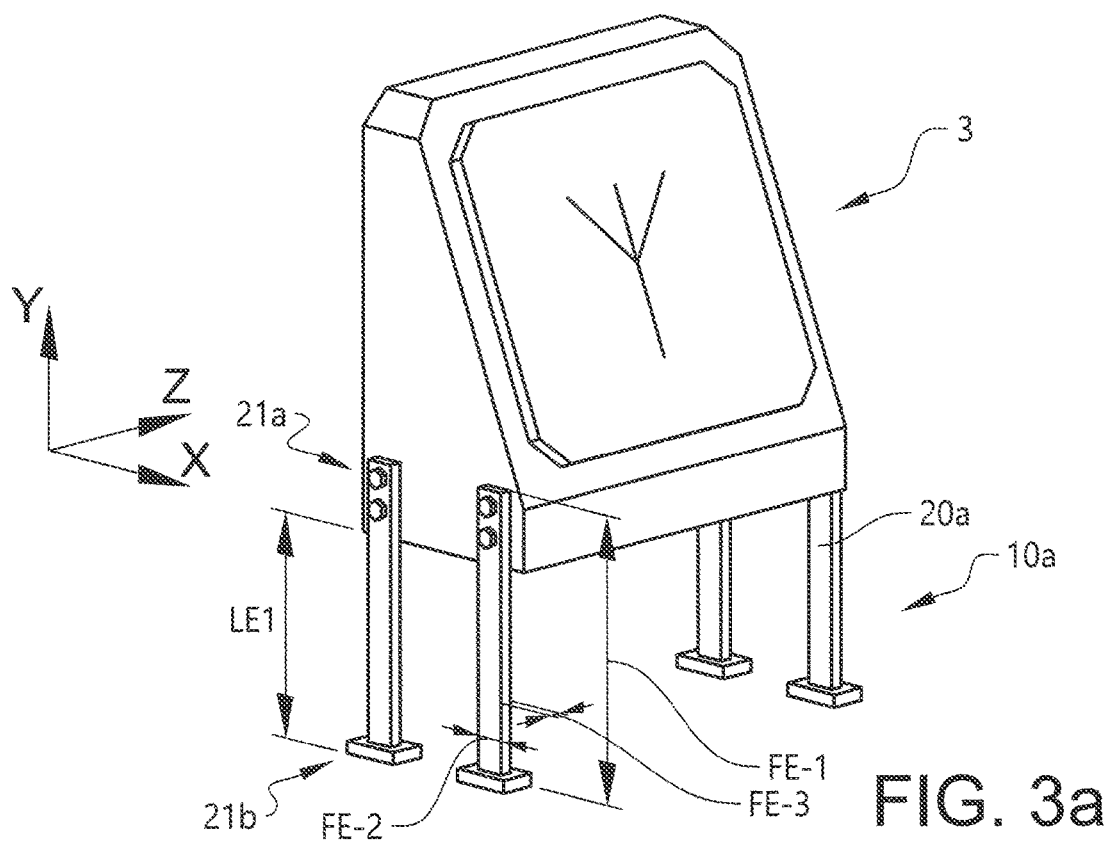

FIG. 3a discloses a first embodiment of an antenna fastener arrangement 10a holding a sensor device 3 in form of an antenna. The antenna fastener arrangement 10a comprises a number of fastener elements 20a. In FIG. 3a the number of antenna elements is four, two arranged at each of the two opposite sides of the sensor device 3. The opposite sides of the sensor device 3 is herein defined as the two opposite sides facing a perpendicular direction in relation to the direction in which the sensor device 3 is directed.

Each fastener 20a element has a first and a second end 21a, 21b positioned in opposite ends of the fastener element 20a. The fastener elements 20a are attached to the sensor device 3 in a first end 21a and are attachable to a platform (not shown) in a second end 21b.

Respective fastener element 20a has an extension along a first axis FE-1, along a second axis FE-2 and along a third axis FE-3. In FIG. 3a the first axis FE-1 coincide with the indicated Y-axis, and is hereinafter referred to as Y, the second axis FE-2 coincide with the indicated X-axis, and is hereinafter referred to as X, and the third axis FE-3 coincide with the indicated Z-axis, and is hereinafter referred to as Z. The extension along one of the first, second or third axes X is larger than the extension along the two remaining axes X, Z. The extension along one of the two remaining axes X is larger than the extension along of the finally remaining axis Z. Thus, according to the embodiment of the invention disclosed in FIG. 3a the fastener elements 20a can be said to have the form of essentially flat bars. The first end 21a and the second end 21b are opposite ends of the fastener element 20a along the first axis Y. The first axis Y is perpendicular to the second axis X and the third axis Z. The second axis X is perpendicular to the third axis Z.

The dimensions of respective fastener element 20a, i.e. the extension along the first, second and third axis X, Y, Z, are configured such that desired properties are obtained in regards to stiffness, physical spring properties and critical load in respective direction. These properties, together with prevailing end conditions, determines the critical load of the fastener element 20a. The desired properties of the fastener elements 20a used are dependent on the contemplated implementation of the sensor fastener arrangement 10a.

Figure 3B:
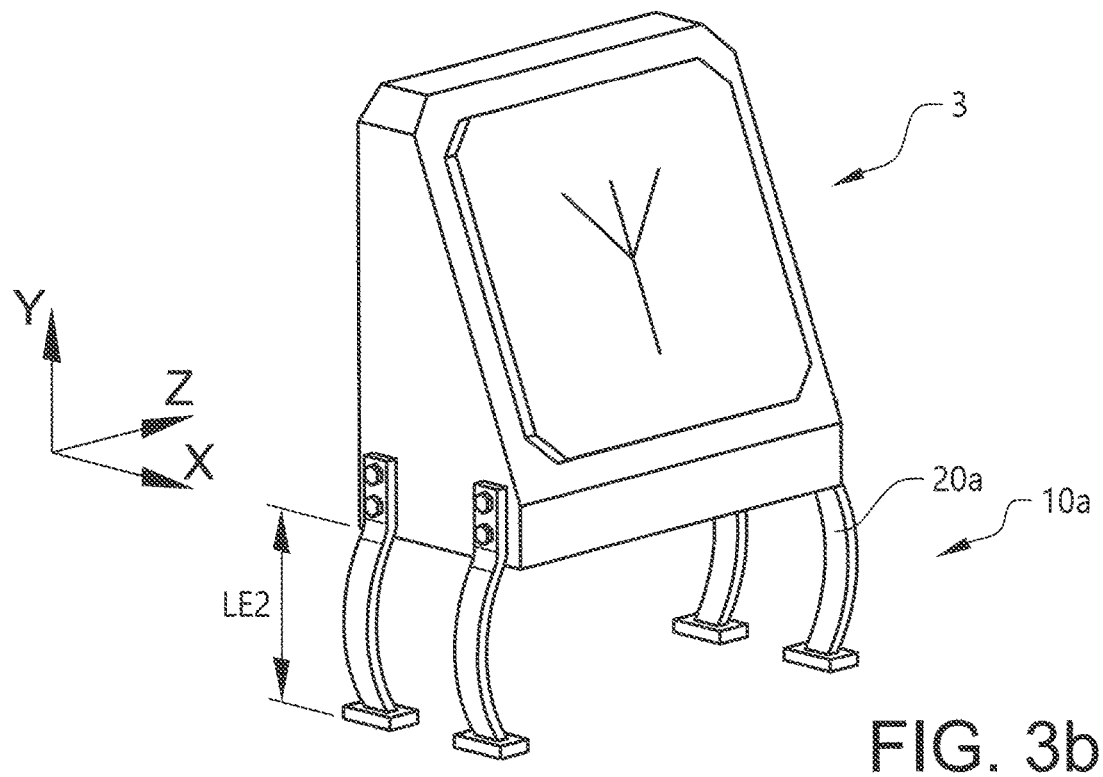

As is shown in FIGS. 3a and 3b, the fastener elements 20a of the sensor fastener arrangement 10a are rigid in an essentially straight configuration when being in the first state, shown in FIG. 3a, and temporarily reversibly deformable by being buckled by lateral deflection when being in the second state, shown in FIG. 3b.

According to the invention, when the platform 1 of the sensor device 3, and/or the sensor device 3 directly, is exposed to an impact force, in turn exposing a fastener element 20a to a compressive force, exceeding the critical load of that fastener element 20a, the fastener element 20a goes from being in the first state to temporarily being in the second state. Thereby the fastener element 20a goes from having a first rigid shape to temporarily being reversibly deformed. When the impact force subsequently is terminated, the fastener element 20a goes from temporarily being in the second state back to being in the first state, whereby the fastener element 20a goes from temporarily being reversibly deformed back to having the first rigid shape. A sensor fastener arrangement 10a with fastener elements 20a being in the second state are shown in FIG. 3b. The force referred to herein, i.e. the force which the fastener elements 20a are exposed to, is a compressive force acting on the fastener elements 20a along the first axis Y. The Y-axis is also the axis of deformation, meaning that it is along the Y-axis that the fastener elements 20a deform when the critical load is exceeded by a compressive force resulting from an impact force.

The critical load is selected such that the fastener elements 20a deform before the sensor device 3 is exposed to a maximum acceleration limit of the sensor device, i.e. the force at which the sensor device may get damaged by the impact force.

Thus, the compressive movement along the axis of deformation that the fastener elements 20a undergo can be seen in FIGS. 3a and 3b. In FIG. 3a the longitudinal extension of the fastener elements 20a are indicated by LE1. When being deformed the fastener elements 20a undergo lateral deflection whereby the longitudinal extension along a first axis FE-1 of the fastener element is temporarily decreased, as is indicated in FIG. 3b by LE2. This temporary decrease in extension due to buckling of the fastener element 20a is generally referred to as compression.

In FIGS. 3a and 3b the fastener elements 20a are directly attached to the sensor device 3, but the invention can also be realized by indirectly attaching the fastener elements 20a to the sensor device 3, for example by means of a frame.

Which of Euler's laws that an antenna fastener arrangement complies with is dependent on how respective fastener element is attached to the sensor device and to the platform to which the sensor device is arranged. Thus, this is one of the parameters that are selectable in order to obtain desired properties of the antenna fastener arrangement.

For the sensor fastener arrangement 10a shown in FIGS. 3a and 3b, the second end 21b of a fastener element 20a is indicated to be fixedly attachable to a platform (not shown) and the first end 21a is fixedly attached to the sensor device 3. Thereby the critical load of the fastener element 20a shown in FIGS. 3a and 3b is determined by applying Euler's fourth law of critical load.

Figure 4A:
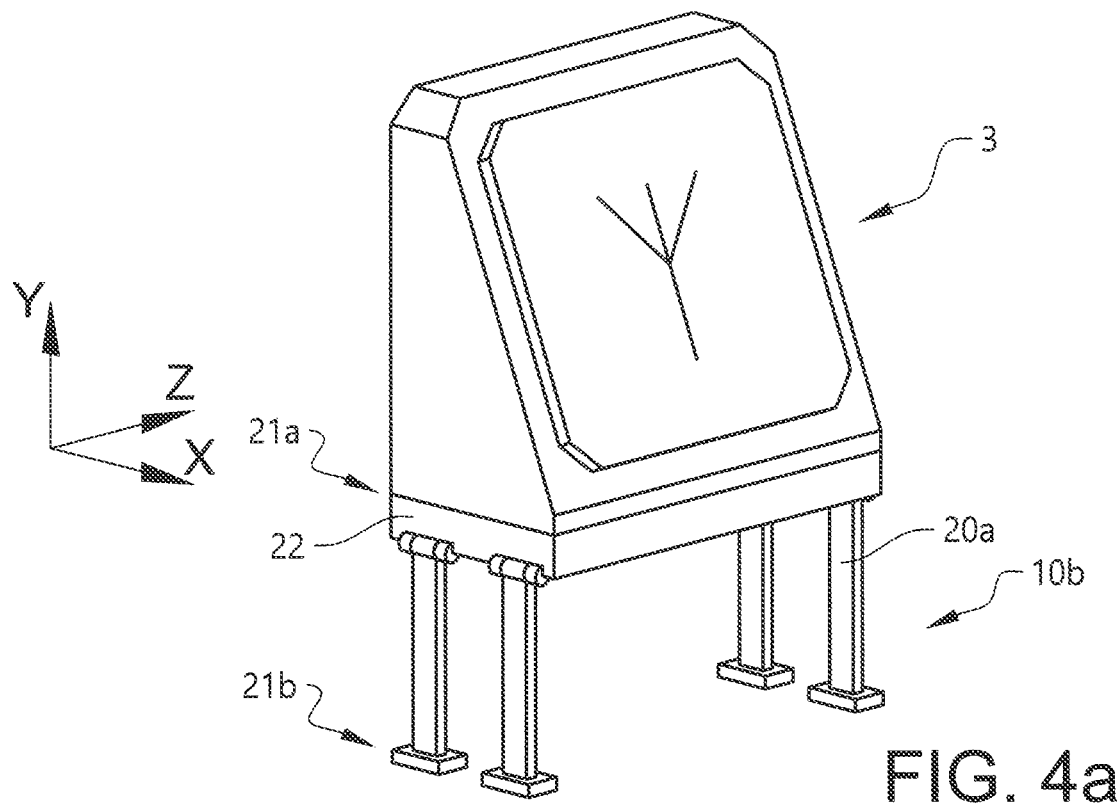

FIG. 4a shows another exemplary embodiment of a sensor fastener arrangement 10b according to the invention. The exemplary fastener arrangement 10b shown in FIG. 4a is arranged to the sensor device 3 by means of a frame structure 22, wherein the frame structure 22 is configured for holding the sensor device 3.

For the exemplary embodiment of a sensor fastener arrangement 10b shown in FIG. 4a, the second end 21b of a fastener element 20a is indicated to be fixedly attachable to a platform (not shown) and the first end 21a is hingedly attached to the sensor device 3. Thereby the critical load of the fastener element 20a shown in FIG. 4a is determined by applying Euler's third law of critical load.

Figure 4B:
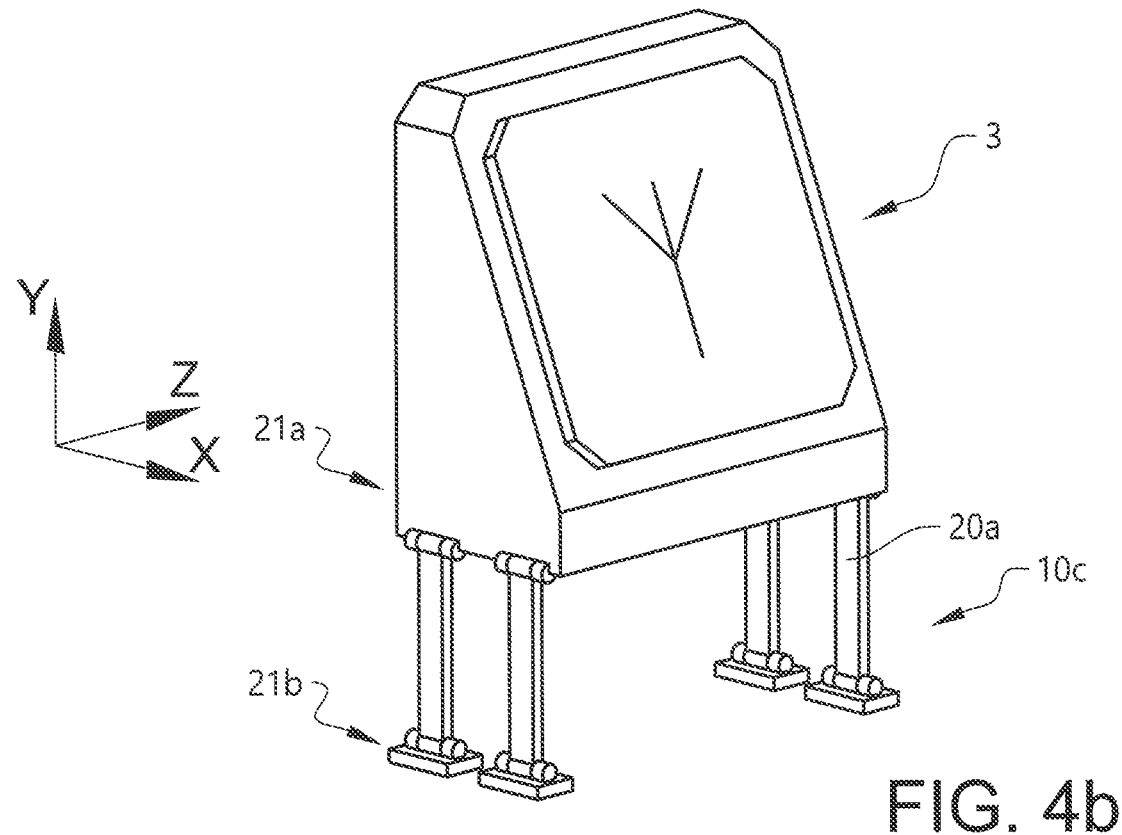

FIG. 4b shows yet another exemplary embodiment of a sensor fastener arrangement 10c according to the invention. For the exemplary embodiment of a sensor fastener arrangement 10c shown in FIG. 4b the second end 21b of a fastener element 20a is indicated to be hingedly attachable to a platform (not shown) and the first end 21a is hingedly attached to the sensor device 3. Thereby the critical load of the fastener element 20a shown in FIG. 4b is determined by applying Euler's second law of critical load.

Embodiments of sensor fastener arrangements governed by Euler's second law of critical load provides the highest spring stiffness of the fastener elements before lateral deflection occurs and provides the lowest buckling load, also referred to bending load. This means that the load required for bending of the fastener element once the fastener element has started to bend is low.

Figure 4C:
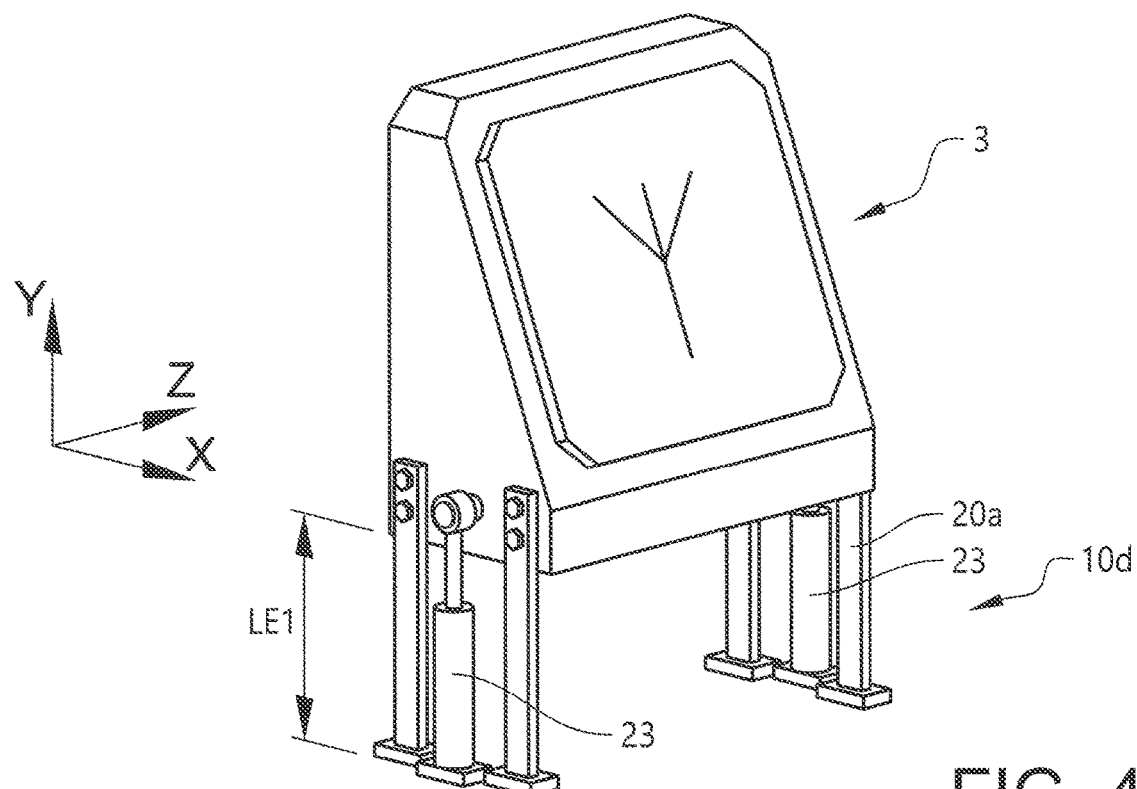

FIG. 4c shows an exemplary embodiment of a sensor fastener arrangement 10d according to the invention. In addition to fastener elements 20a, the sensor fastener arrangement 10d comprises two dampers 23, one damper arranged on each opposite side of the sensor device 3. The dampers 23 may also be arranged to the platform (not shown) to which the sensor fastener arrangement 10d is arrangeable. The dampers 23 are either configured or arranged to dampen a compressive movement along the axis of deformation, i.e. along the Y-axis, or configured or arranged to dampen extending movements along the axis of deformation.

As previously stated, and as is shown in FIGS. 3a and 3b, compressive movement may be defined as deformation decreasing the longitudinal extension, i.e. from LE1 to LE2. Extending movement is the opposite movement to compressive movement, i.e. the increase or extension in longitudinal direction, LE1.

Dampers configured for dampen compressive movement provide the exemplary advantage that, once the fastener elements of the sensor fastener arrangement starts to deform the reversible deformation by the compressive movement is dampened. Thereby the acceleration the sensor device is exposed to when the fastener elements reversibly deform is decreased. Once the critical load of a fastener element is exceeded, and the fastener element has started to deform, the load required for further deformation is lower. This is particularly true for realizations where Euler's second law of critical load apply.

Dampers configured for dampening extending movement provide the exemplary advantage that once the fastener elements has been reversibly deformed, use of a damper prevents that the deformed fastener element forcefully springs back whereby a whiplash effect can be avoided. Thereby, it may for example be avoided that the fastener element deforms when springing back or that the sensor device may be damaged due to the whiplash.

For the exemplary embodiment of a sensor fastener arrangement 10d shown in FIG. 4c both the first and the second ends 21a, 21b of the fastener elements 20a is indicated to be fixedly attached or attachable to the sensor device 3 and to a platform (not shown) respectively. Thereby the critical load of the fastener element 20a shown in FIG. 4c is determined by applying Euler's fourth law of critical load.

Figure 4D:
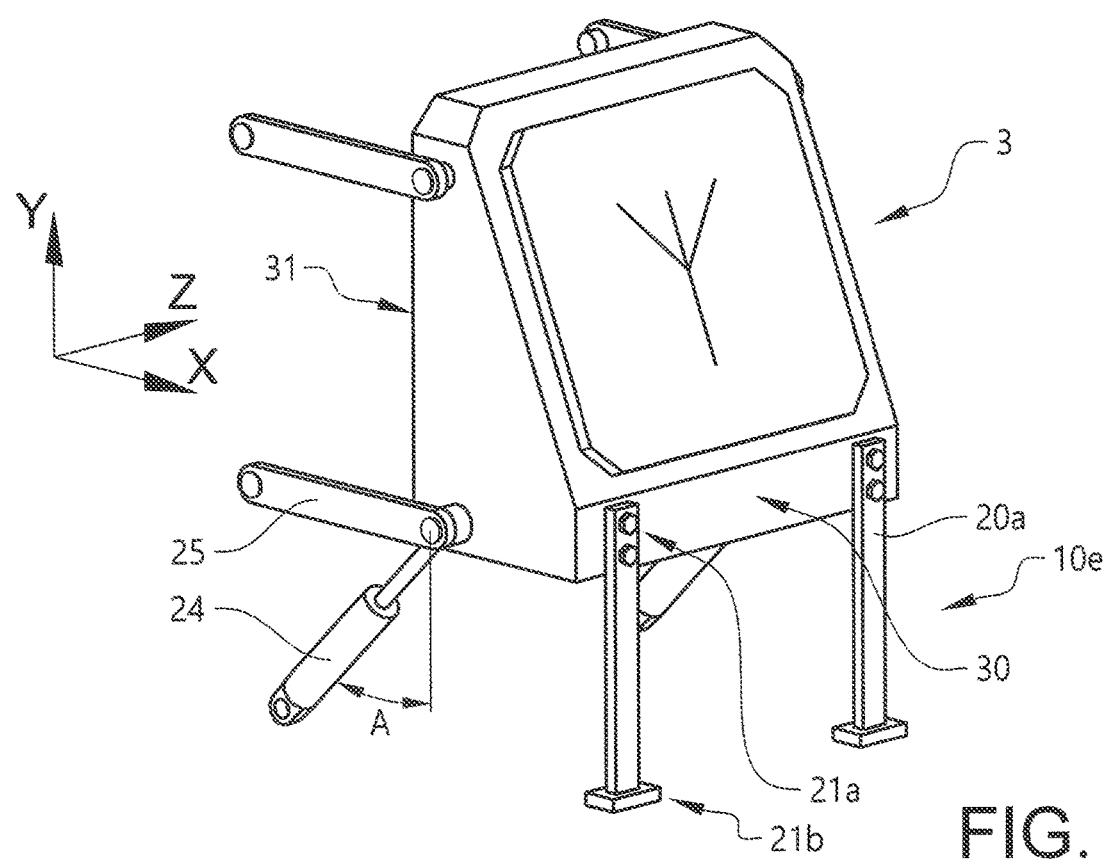

FIG. 4d shows another exemplary embodiment of a sensor fastener arrangement 10e according to the invention. The sensor fastener arrangement 10e of FIG. 4d comprises just two fastener elements 20a arranged at a front side 30 of the sensor device 3. The front side 30 herein is defined as the side facing in the direction in which the sensor device 3 is directed. A backside 31 of the sensor device 3 is herein defined as the side being directed in opposite direction as the front side 30. The sensor fastener arrangement 10 shown in FIG. 4d also comprises two dampers 24, one damper 24 arranged at each side of the sensor device 3. The dampers 24 of the sensor fastener arrangement 10e of FIG. 4d are arranged at an angle A in relation to the fastener elements 20a. The dampers 24 are thereby capable of dampening movements not only in the direction of the axis of deformation, i.e. along the Y-axis, but also in the direction of the X-axis. The sensor fastener arrangement 10e of FIG. 4d further comprises a number of pivot arms 25. Pivot arms 25 may be used to control movements of the sensor device 3, for example along the Y-axis as for the exemplary embodiment shown in FIG. 4d.

Also for the exemplary embodiment of a sensor fastener arrangement 10e shown in FIG. 4d both the first and the second end 21a, 21b is indicated to be fixedly attached or attachable to the sensor device 3 and to a platform (not shown) respectively. Thereby the critical load of the fastener element 20a shown in FIG. 4c is determined by applying Euler's fourth law of critical load.

Figure 4E:
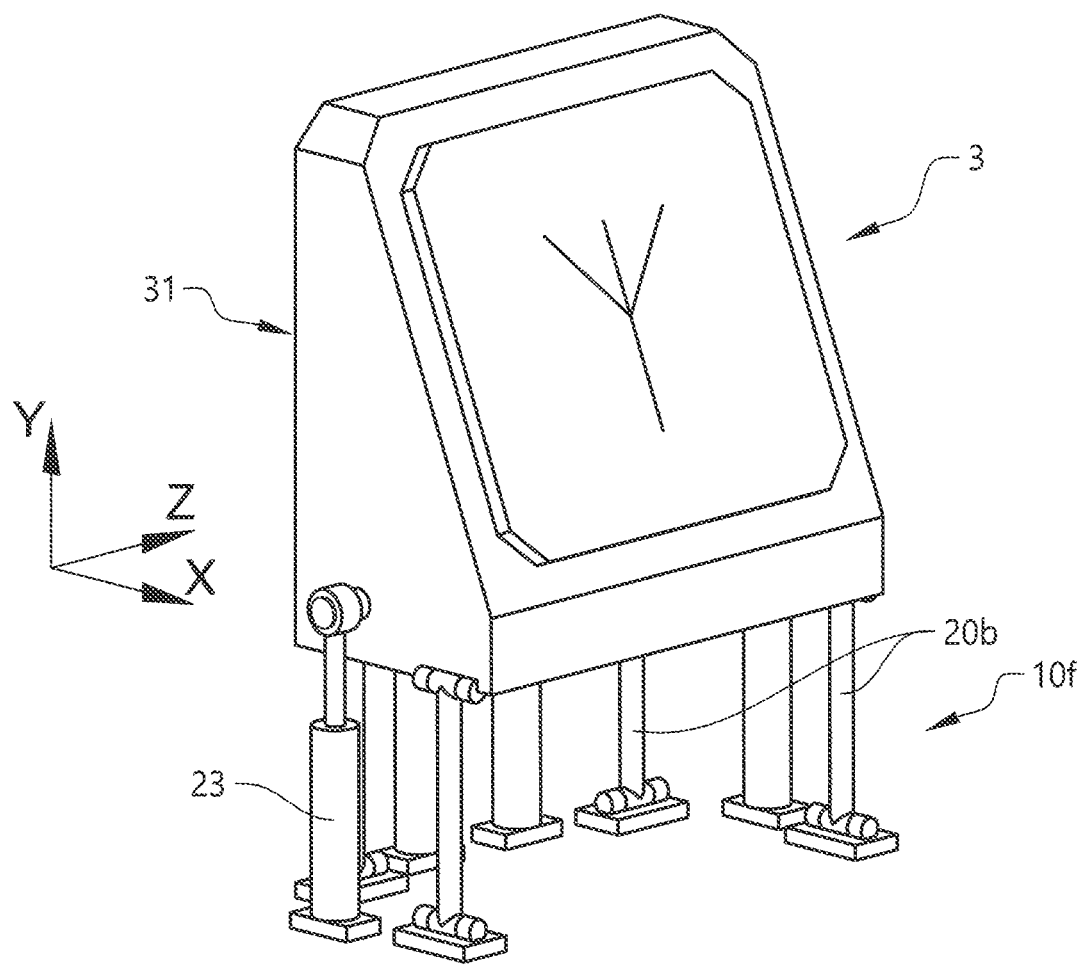

FIG. 4e shows another exemplary embodiment of a sensor fastener arrangement 10f according to the invention. The exemplary embodiment of a sensor fastener arrangement 10f shown in FIG. 4e comprises fastener elements 20b in the form of essentially circular rods, i.e. rods with an essentially circular cross section. The fastener elements 20b are configured to be hingedly attached to the sensor device 3 and to be hingedly attachable to a platform (not shown), whereby the critical load of the fastener elements 20b are determined by applying Euler's second law of critical load. As previously stated, Euler's second law of critical load provides the highest spring constant against buckling load of Euler's second, third and fourth laws of critical load.

Two of the four fastener elements 20b of the exemplary embodiment of a sensor fastener arrangement 10f shown in FIG. 4e are provided at a backside 31 of the sensor device 3. The two remaining fastener elements 20b are arranged at opposite sides of the sensor device 3. The sensor fastener arrangement 10f of FIG. 4e is further provided with four dampers 23.

The various exemplary embodiments of sensor fastener arrangements 10c, 10d, 10e, 10f of FIGS. 4a, 4b, 4c and 4d are intended to show various embodiments of how a sensor fastener arrangement according to the invention may be realized. The invention is not to be seen as being limited to these particular realizations. It is considered to be obvious that the number of, and positioning of, fastener elements according to the invention, dampers and/or pivot arms may be different between various realizations, and may for example be determined by the implementation of a specific sensor fastener arrangement.

The invention claimed is:

1. A sensor fastener arrangement (10a-f) for holding a sensor device (3), comprising:
a plurality of fastener elements (20a, 20b),
wherein:
the plurality of fastener elements (20a, 20b) are configured to arrange the sensor device (3) to a platform (1),
each respective one of the plurality of fastener elements (20a, 20b) is rigid in a first state and reversibly deformable in a second state,
when the platform (1) of the sensor device (10a-f) and/or the sensor device (3) is exposed to an impact force that, in turn, exposes at least one fastener element of the plurality of fastener elements (20a, 20b) to a compressive force exceeding a critical load of the at least one fastener element (20a, 20b), the at least one fastener element (20a, 20b) goes from being in the first state to temporarily being in the second state, whereby the at least one fastener element (20a, 20b) goes from having a first rigid shape to temporarily being reversibly deformed, after which, when the impact force is terminated, the at least one fastener element (20a, 20b) goes from temporarily being in the second state back to being in the first state, whereby the at least one fastener element (20a, 20b) goes from temporarily being reversibly deformed to having the first rigid shape,
wherein the sensor device (3) has a maximum acceleration limit defining the maximum acceleration the sensor device (3) may be exposed to without being damaged,
the critical load of the plurality of fastener elements (20a, 20b) are selected such that the plurality of fastener elements (20a, 20b) deform before the sensor device (3) is exposed to the maximum acceleration limit, and
the plurality of fastener elements (20a, 20b) are rigid in an essentially straight configuration when being in the first state and temporarily reversibly deform by lateral deflection when being in the second state.

2. Sensor fastener arrangement (10a-f) according to claim 1, wherein when the sensor device (3) is exposed to a force in turn exposing each respective one of the plurality of fastener elements to a compressive force, the compressive force acts on the at least one fastener element (20a, 20b) along an axis of deformation, and wherein each respective one of the plurality of fastener elements (20a, 20b) is reversibly deformable by a compressive movement along the axis of deformation.

3. Sensor fastener arrangement (10a-f) according to claim 1, wherein:
- each respective one of the plurality of fastener elements (20a) has an extension along a first axis (FE-1), along a second axis (FE-2) and along a third axis (FE-3),
- the extension along one of the first, second or third axes (FE-1, FE-2, FE-3) is larger than the extension along the two remaining axes (FE-2, FE-3), and
- the extension along one of the two remaining axes (FE-2) is larger than the extension along of the finally remaining axis (FE-3).

4. Sensor fastener arrangement (10d, 10e, 10f) according to claim 1, wherein in addition to the plurality of fastener elements (20a, 20b) the sensor fastener arrangement (10d, 10e, 10f) comprises at least one damper (23, 24).

5. Sensor fastener arrangement (10d, 10e, 10f) according to claim 1, wherein in addition to the plurality of fastener elements (20a, 20b) the sensor fastener arrangement (10d, 10e, 10f) comprises at least one damper (23, 24) and wherein the at least one damper (23, 24) is arranged to dampen an extending movement along the axis of deformation.

6. Sensor fastener arrangement (10d, 10e, 10f) according to claim 1, wherein:
- in addition to the plurality of fastener elements (20a, 20b) the sensor fastener arrangement (10d, 10e, 10f) comprises at least one damper (23, 24), and
- the at least one damper (23, 24) is arranged to dampen a compressive movement along the axis of deformation.

7. Sensor fastener arrangement (10d, 10e, 10f) according to claim 4, wherein the at least one damper (23, 24) is a damper (23, 24) from a group of possible damper arrangements comprising:
- hydraulic dampers
- viscous dampers, and/or
- spring dampers.

8. Sensor fastener arrangement (10a-f) according to claim 1, wherein:
- each respective one of the plurality of fastener elements (20a, 20b) is attachable to a sensor device (3) in a first end (21a) and to a platform (1) in a second end (21b), and
- the first end (21a) and the second end (21b) are opposite ends of each respective one of the plurality of fastener elements (20a, 20b) along the axis of deformation.

9. Sensor fastener arrangement (10a-f) according to claim 1, wherein at least one of Euler's laws of critical load applies for the plurality of fastener elements (20a, 20b) and whereby the plurality of fastener elements (20a, 20b) are selected based on their critical load.

10. Sensor fastener arrangement (10a, 10d, 10e) according to claim 1, wherein the first and second ends (21a; 21b) of at least one of the plurality of fastener elements (20a) are configured to be fixedly attachable to the sensor device (3) and to the platform (1), whereby the critical load of the at least one fastener element (20a) is determined by applying Euler's fourth law of critical load.

11. Sensor fastener arrangement (10c, 10f) according to claim 1, wherein the first and second ends (21a; 21b) of at least one of the plurality of fastener elements (20a, 20b) are configured to be hingedly attachable to the sensor device (3) and to the platform (1), whereby the critical load of the at least one fastener element (20a, 20b) is determined by applying Euler's second law of critical load.

12. Sensor fastener arrangement (10b) according to claim 1, wherein:
- one of the first and second ends (21a; 21b) of at least one fastener element of the plurality of fastener elements (20a) is configured to be attachable to the sensor device (3) and the other end (21b; 21a) is configured to be attachable to the platform (1), and
- one of the first and second ends (21a; 21b) of the at least one fastener element (20a) is fixedly attachable and the other end (21b; 21a) is hingedly attachable, whereby the critical load of the at least one fastener element (20a) is determined by applying Euler's third law of critical load.

13. Sensor fastener arrangement (10a-f) for holding a sensor device (3) according to claim 1, wherein the sensor device (3) is an antenna, a rangefinder or an aiming device.

14. An antenna installation (4) comprising a sensor fastener arrangement (10a-f) according to claim 1 and a sensor device (3) in form of an antenna.

15. An antenna installation (4) according to claim 14, wherein the antenna is a panel antenna.

16. An antenna installation (4) according to claim 1, wherein the antenna is a phased array antenna.

17. A ship comprising an antenna installation (4) according to claim 1.

* * * * *